United States Patent
Lopatinsky et al.

(12)

(10) Patent No.: US 6,388,346 B1
(45) Date of Patent: May 14, 2002

(54) AXIAL FLUID FLOW INDUCING DEVICE WITH MULTIPLE MAGNETICALLY DRIVEN IMPELLERS

(75) Inventors: Edward L. Lopatinsky; Saveliy T. Rosenfeld, both of San Diego; Daniel Schaefer, Palm Desert, all of CA (US)

(73) Assignee: Air Concepts, Inc., San Diego, CA (US)

( * ) Notice: Subject to any disclaimer, the term of this patent is extended or adjusted under 35 U.S.C. 154(b) by 0 days.

(21) Appl. No.: 09/414,465

(22) Filed: Oct. 7, 1999

Related U.S. Application Data

(63) Continuation-in-part of application No. 09/303,334, filed on Apr. 30, 1999, which is a continuation-in-part of application No. 09/172,524, filed on Oct. 14, 1998.

(51) Int. Cl.⁷ .............................................. H02K 16/02
(52) U.S. Cl. ................... 310/63; 310/254; 310/156.38; 310/114; 318/254; 417/423.1; 417/423.7
(58) Field of Search ............................ 310/254, 156, 310/216, 179, 218, 164, 63, 114; 318/254; 417/356, 423.1, 423.7; 623/3.13, 3.14, 3.15

(56) References Cited

U.S. PATENT DOCUMENTS

| | | | |
|---|---|---|---|
| 3,872,334 A | * | 3/1975 | Loubier .................... 310/43 |
| 4,011,475 A | * | 3/1977 | Schmider .................. 310/68 R |
| 4,367,413 A | * | 1/1983 | Nair ............................ 290/52 |
| 4,563,622 A | * | 1/1986 | Deavers et al. ............. 318/254 |
| 4,957,504 A | * | 9/1990 | Chardack ........................ 623/3 |
| 5,209,650 A | * | 5/1993 | Lemieux ...................... 417/356 |
| 5,211,546 A | * | 5/1993 | Isaacson et al. ............ 417/356 |
| 5,290,227 A | * | 3/1994 | Pasque ......................... 600/16 |
| 5,598,071 A | * | 1/1997 | Dunfield et al. ............ 318/254 |
| 5,616,974 A | * | 4/1997 | Yamada ..................... 310/68 B |

* cited by examiner

*Primary Examiner*—Karl Tamai
(74) *Attorney, Agent, or Firm*—Charles F. Reidelbach, Jr.; Higgs, Fletcher & Mack LLP

(57) ABSTRACT

A multiple impeller flow inducing device in which driver coils are intermittently energized in timed relation to rotation of the impellers to interact with permanently magnetized portions of the impeller to rotate the same. The impellers can be rotated in opposite directions or in the same direction. A two section impeller construction allows each section to be magnetized in opposite pole orientation and when assembled creating alternate pole orientations of successive portions, arcuate segments forming a shroud or the type of blades can be magnetized to provide the impeller magnetized portions. Stator guide vanes can be interposed between successive impellers.

35 Claims, 16 Drawing Sheets

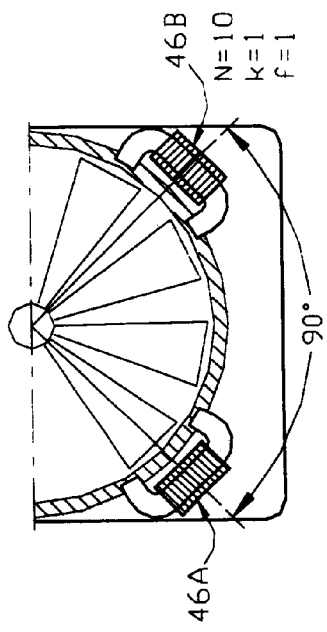
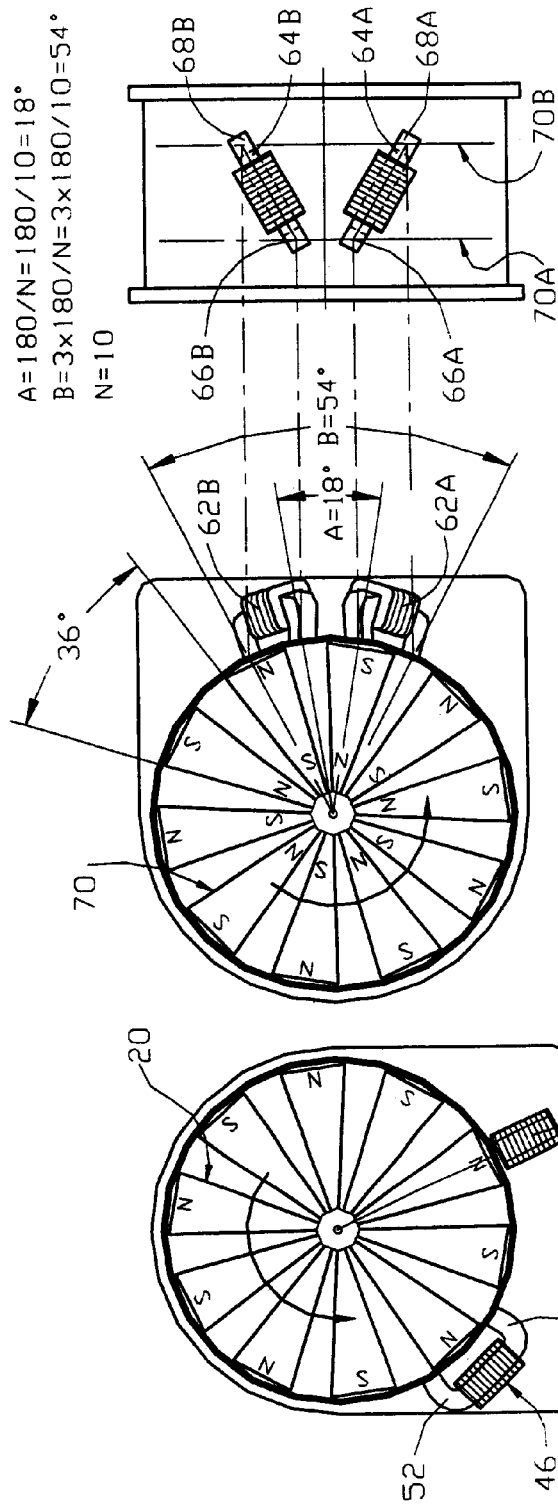
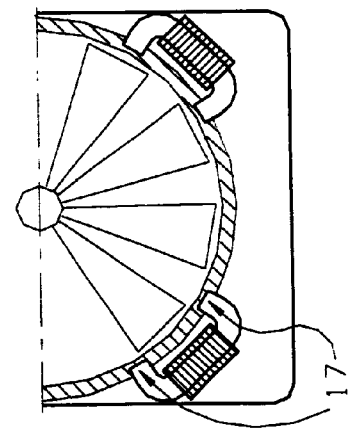
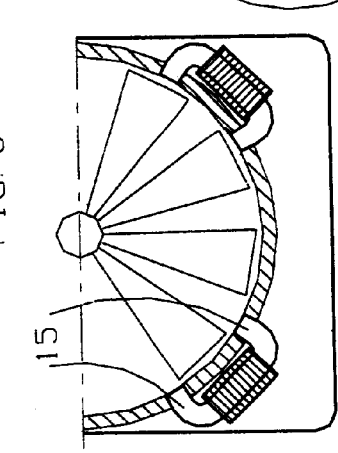

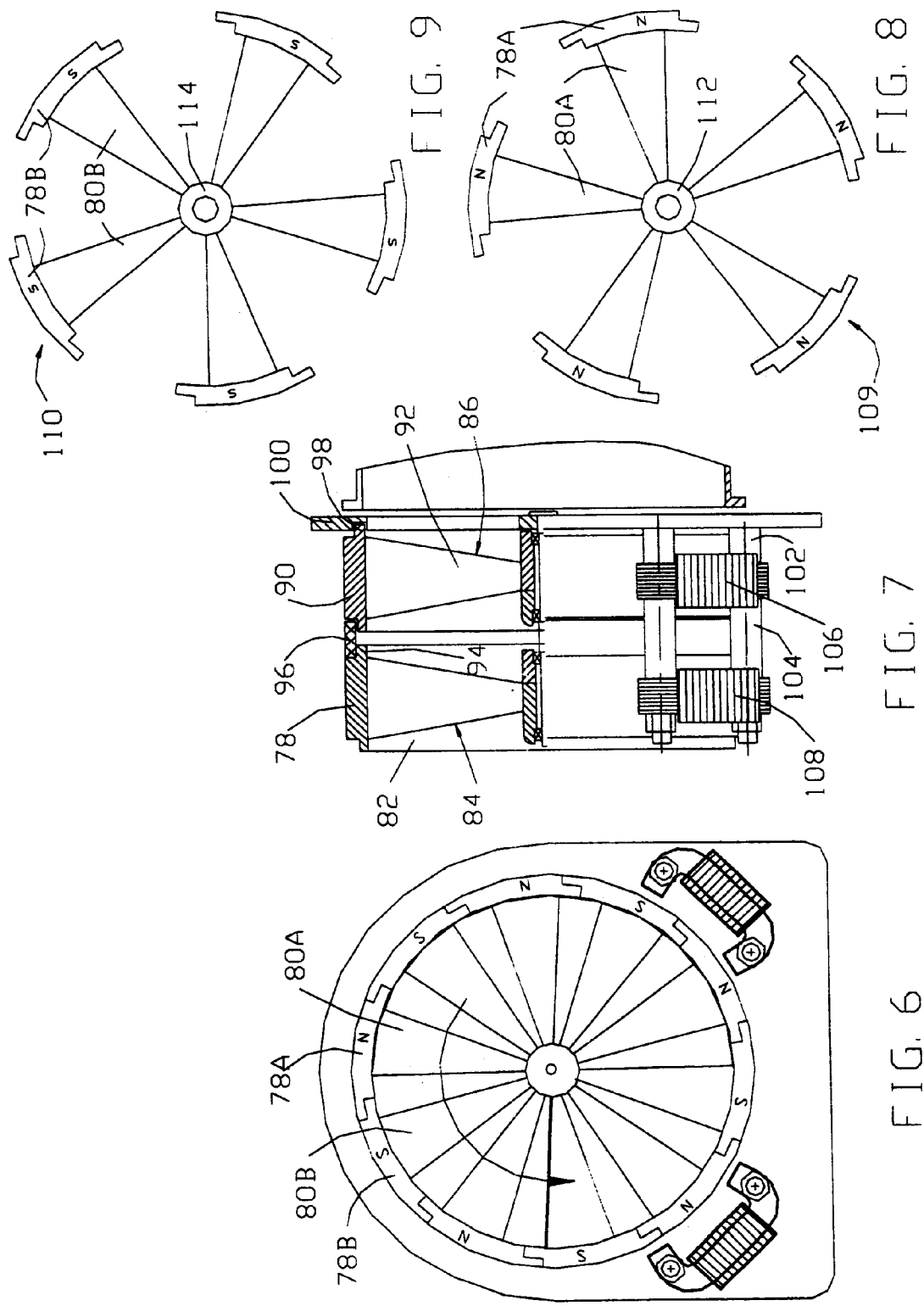

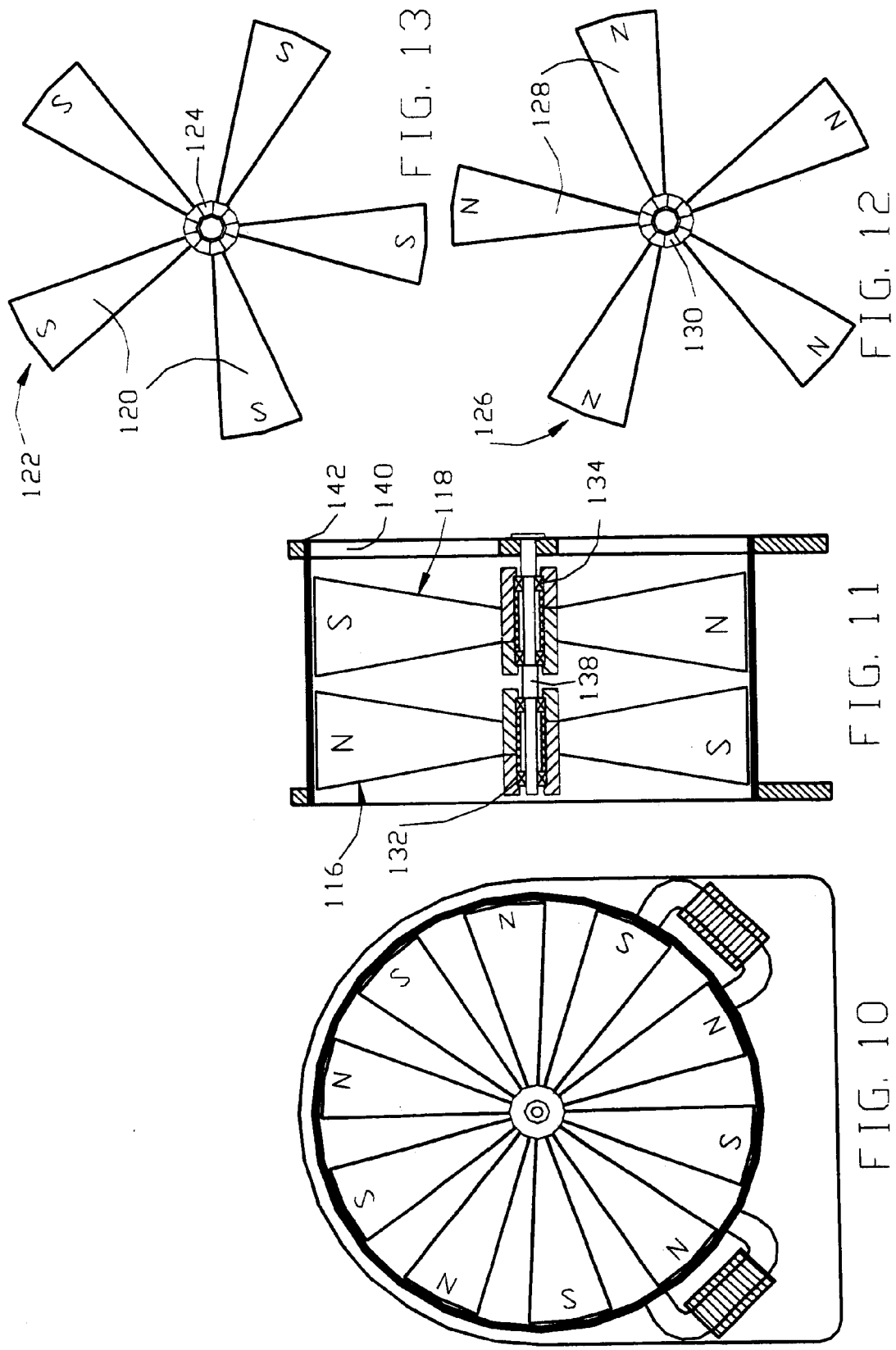

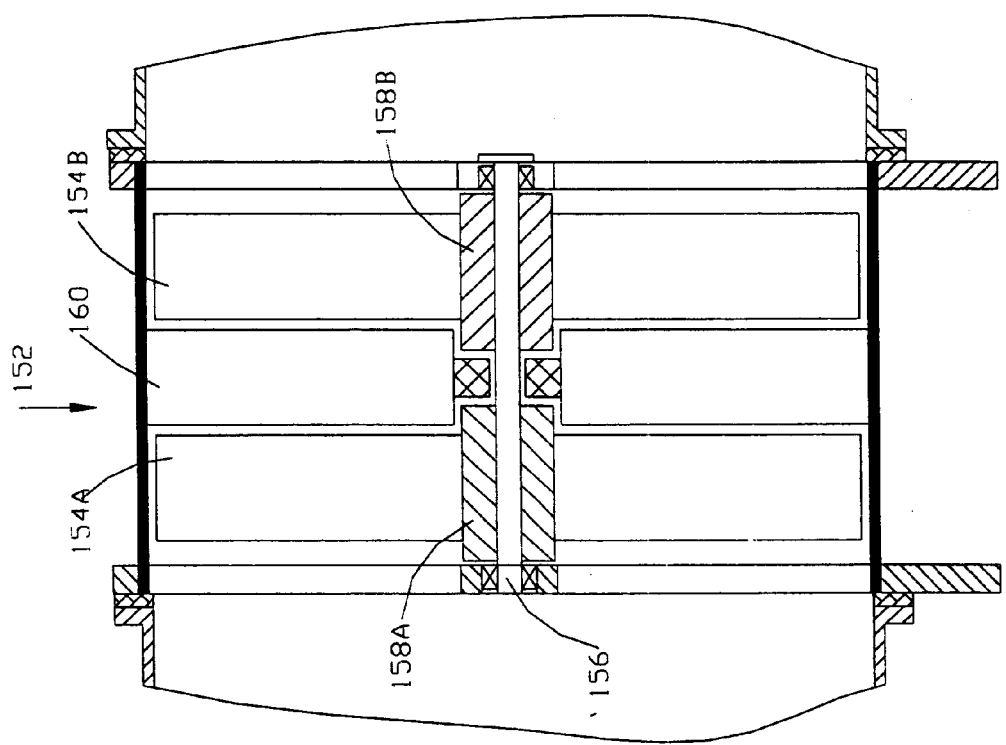
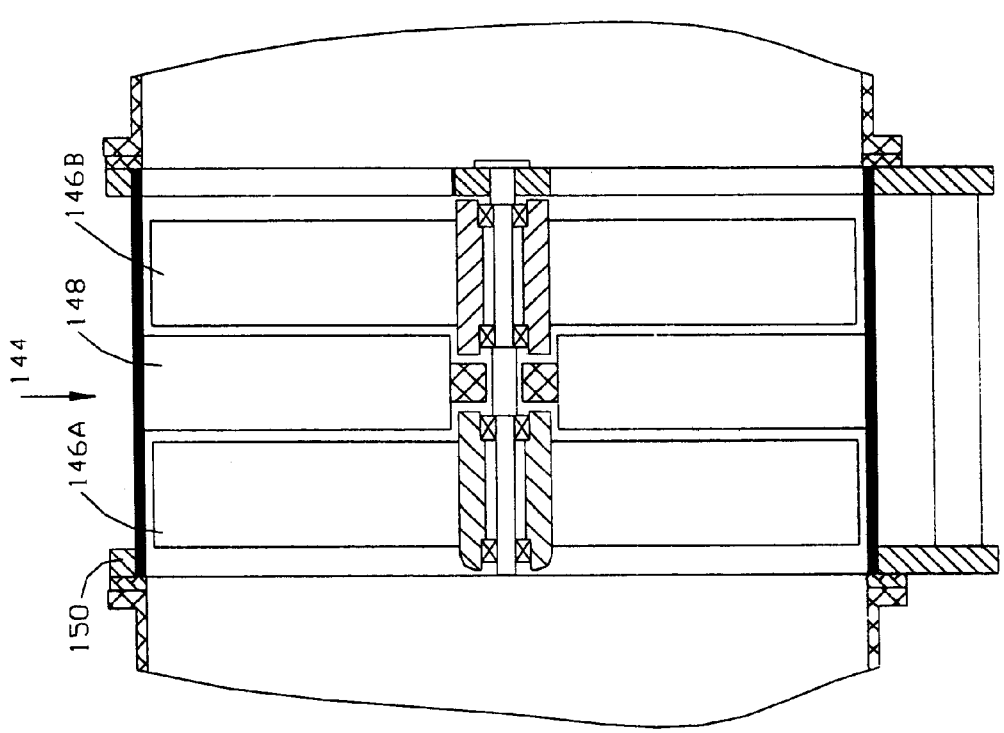

Speed Control for Multiple Magnetically Driven Impellers

Speed Control for Multiple Magnetically Driven Impellers

AXIAL FLUID FLOW INDUCING DEVICE WITH MULTIPLE MAGNETICALLY DRIVEN IMPELLERS

CROSS-REFERENCE TO RELATED APPLICATIONS

This is a continuation-in-part of U.S. Ser. No. 09/303,334, filed on Apr. 30, 1999, which is a continuation-in-part of U.S. Ser. No. 09/172,524, filed on Oct. 14, 1998.

BACKGROUND OF THE INVENTION

This invention concerns axial fluid flow inducing devices such as fans, which use a set of rotating blades reacting with the fluid to cause axial fluid flow.

In the above-referenced copending application there is described a unique direct magnetic drive in which impeller blades are permanently magnetized to establish a magnetic pole at each blade tip, which interacts with pulsed magnetic fields set up by one or more electromagnets located around the perimeter of the impeller or rotor in such a way that magnetic repulsion and attraction forces acting on the blades cause the impeller to rotate.

In the past, in order to increase the static pressure generated by an axial flow impeller, it has been the practice to provide fixed stator blades providing fluid reaction surfaces increasing the static pressure generated downstream of the impeller. The presence of the stator blades creates flow resistance, reducing flow. To avoid this disadvantage, it is known that counter-rotating impellers increase the static pressure without increasing flow losses in the system. However, complex mechanical drives are necessary in order to drive two or more closely positioned coaxial impellers in opposite directions.

It is one object of the present invention to provide a drive for multi counter rotating impellers not requiring a complex mechanical drive means.

Another known flow device has multiple impellers connected together and rotating in the same direction in order to provide a multiple stage pumping action. However, in order to enable proper multistage operation of synchronously rotating impellers, reduced blade areas must be established that increased the cost. In this application blade area remains the same while rotation speed is changed.

It is thus another object of the present invention to provide a multistage impeller in which the material and labor costs are reduced.

SUMMARY OF THE INVENTION

The above objects as well as others that will become apparent upon reading of the following specification and claims are achieved by an arrangement of a plurality of impellers that are coaxially mounted in a shroud and independently rotated with respect to each other. In a first application of the invention, the impellers are driven by forces created by intermittently generated magnetic fields acting on magnetized portions of each of the impellers so as to rotate the impellers. By causing rotation of two impellers in opposite directions a much-simplified means is provided for obtaining increased static pressure of the fluid flow induced by rotation of the impeller blades. Preferably, the magnetic field is generated by a pulsed generating means including one or more driver coils each having an U-shaped core with opposite core legs extending generally radially and with their ends located adjacent the outer perimeter of the associated impeller.

Preferably, a pair of electromagnetic driver coils is provided which are arranged at an angle to each other and spaced apart so that when one pair of core legs straddles one blade, the other pair has sequential blades aligned with each leg. A pair of sensors, such as Hall effect sensors, are arranged to detect the passage of the leading edge of each successive impeller blade and to control the energization and magnetic polarity of the driver coils such as to induce rotation in opposite directions of each impeller by magnetic interaction between the field of the respective coils and the magnetic field of the permanently magnetized portions of the impeller blades.

For the embodiment of the invention having two counter rotating impellers, each electromagnetic coil is preferably skewed such that respective legs of the coil core are located at the outer perimeter of a respective impeller so that both impellers are energized and driven by the same pair of electromagnetic coils making synchronization of the rotation of the two impellers much simpler. However, using more than one pair of electromagnetic coils is also possible, each disposed around the perimeter of a respective impeller.

Driving the impellers by a single driver coil is also possible. In this case, a simple electromagnet may be utilized in order to locate each impeller in a proper start up position with respect to the driving electromagnetic coil in which the spaced core legs straddle a blade tip.

The impellers preferably have blades of a type of plastic material that is permanently magnetizable and the magnetized tips comprise the outer portions of the impeller blades that are magnetized to interact with the pulsed magnetic fields.

The impellers may be constructed in two sections, each having an alternate set of impeller blades with the tips magnetized with the same polarity, and each impeller section having its tips magnetized with opposite poles to the other section. The impeller sections are interfit at assembly to produce an impeller in which successive blades are magnetized with opposite polarities.

Alternatively, instead of a stationary shroud, the fluid flow passage can be formed by an outer ring that concludes, which is formed by a series of arcuate segments attached to the tip of each rotor blade, each segment interfit to the next adjacent segment on either side. Again, a two-section impeller construction may be advantageously employed.

An intermediate ring fixed to one impeller may also be employed with a labyrinth seal formed between the ring and adjacent end of the corresponding impeller.

The impeller ring segments adjacent the housing end wall may be provided with projecting portions that are received within the housing to form a labyrinth seal, such that while each ring rotates independently of the other, a sealed confinement of the fluid flow is assured.

In another version, the outer ring can be attached to the tips of blades and magnetized by segments with opposite polarities.

The impellers may also have magnetized outer portions which are driven by pairs of driver coils in such a manner as to be driven in the same direction at controllably different rates of rotation such as to produce a multistage pumping action which does not require differing impeller blade areas. A set of stator blades is required to be placed between impellers.

In another version, connected impellers can be disposed on either side of a set of stator blades.

DESCRIPTION OF THE DRAWING FIGS.

FIG. 1A is a fragmentary sectional view of the device shown in FIG. 1, showing an alternate shroud construction with the driver coils in which the driver coil core legs are inserted in holes in the shroud.

FIG. 1B is a fragmentary sectional view of the device shown in FIG. 1 in which the core legs are inserted in recesses in the shroud.

FIG. 1C is a fragmentary sectional view of the device shown in FIG. 1 in which formula parameters for calculating the angle between the driver coils are indicated.

FIG. 3 is an end view of an alternate embodiment of the device utilizing a single driver coil and a simple start up positioning coil.

FIG. 4 is an end view of another alternative embodiment of the device in which a pair of driver coils having an U-shaped core is utilized which are skewed axially in order to enable a single pair of driver coils to drive both of the impellers.

FIG. 5 is a side view of the device shown in FIG. 4 illustrating the orientation of the single pair of driver coils.

FIG. 6 is an end view of yet another alternative of the device according to the invention utilizing magnetized ring segments attached to each set of impeller blade tips forming labyrinth seals with the adjacent impeller and the adjacent housing structure.

FIG. 7 is a partially sectional longitudinal view of the device shown in FIG. 6.

FIGS. 8 and 9 are end views of impeller sections which are interfit together at assembly to form a complete impeller.

FIG. 10 is an end view of another variation of the device according to the invention utilizing a sectional impeller.

FIG. 11 is a transverse longitudinal partially sectional view of the device shown in FIG. 10.

FIGS. 12 and 13 are end views of respective impeller sections separately manufactured and permanently magnetized, then assembled together to form a complete impeller.

Figure 17A:
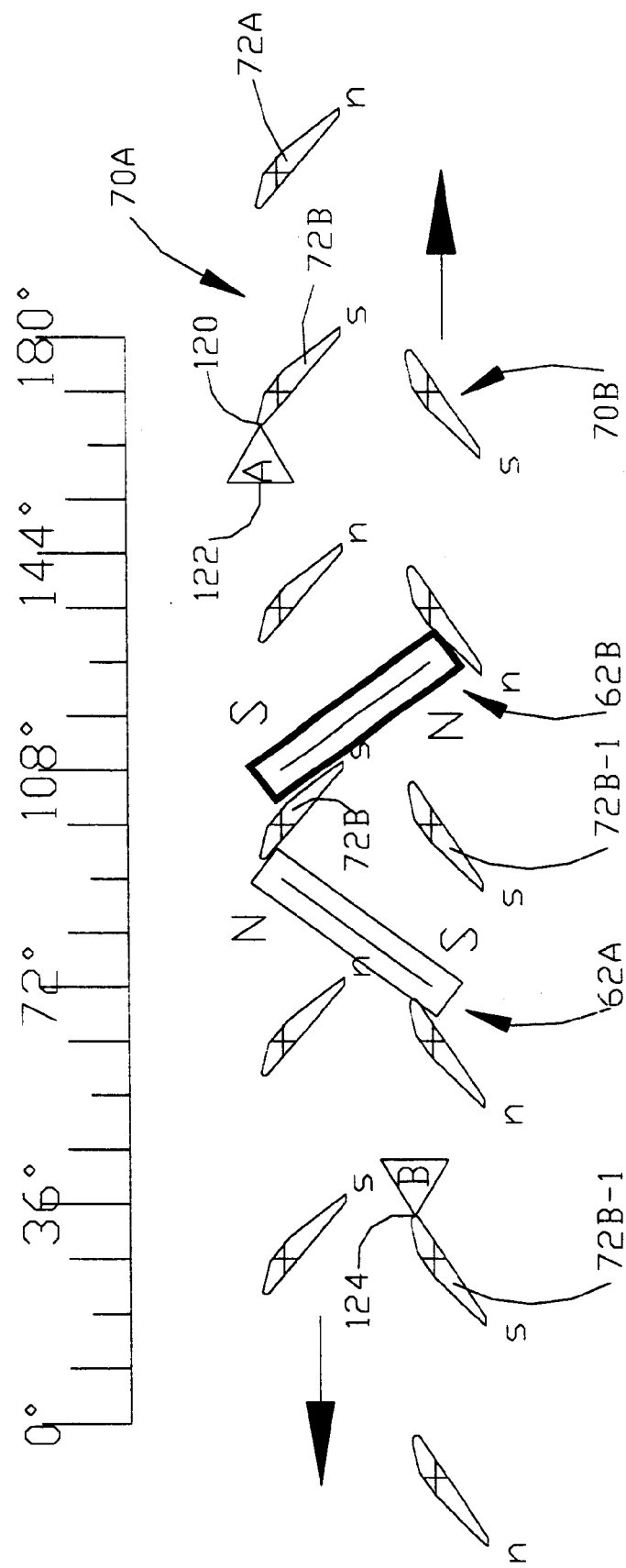

FIGS. 17A and B are diagrams representing the initial and subsequent manner of energization of the skewed single pair of electromagnetic drive coils shown in FIGS. 4 and 5 to cause opposite or counter rotation of the adjacent impellers.

Figure 17B:
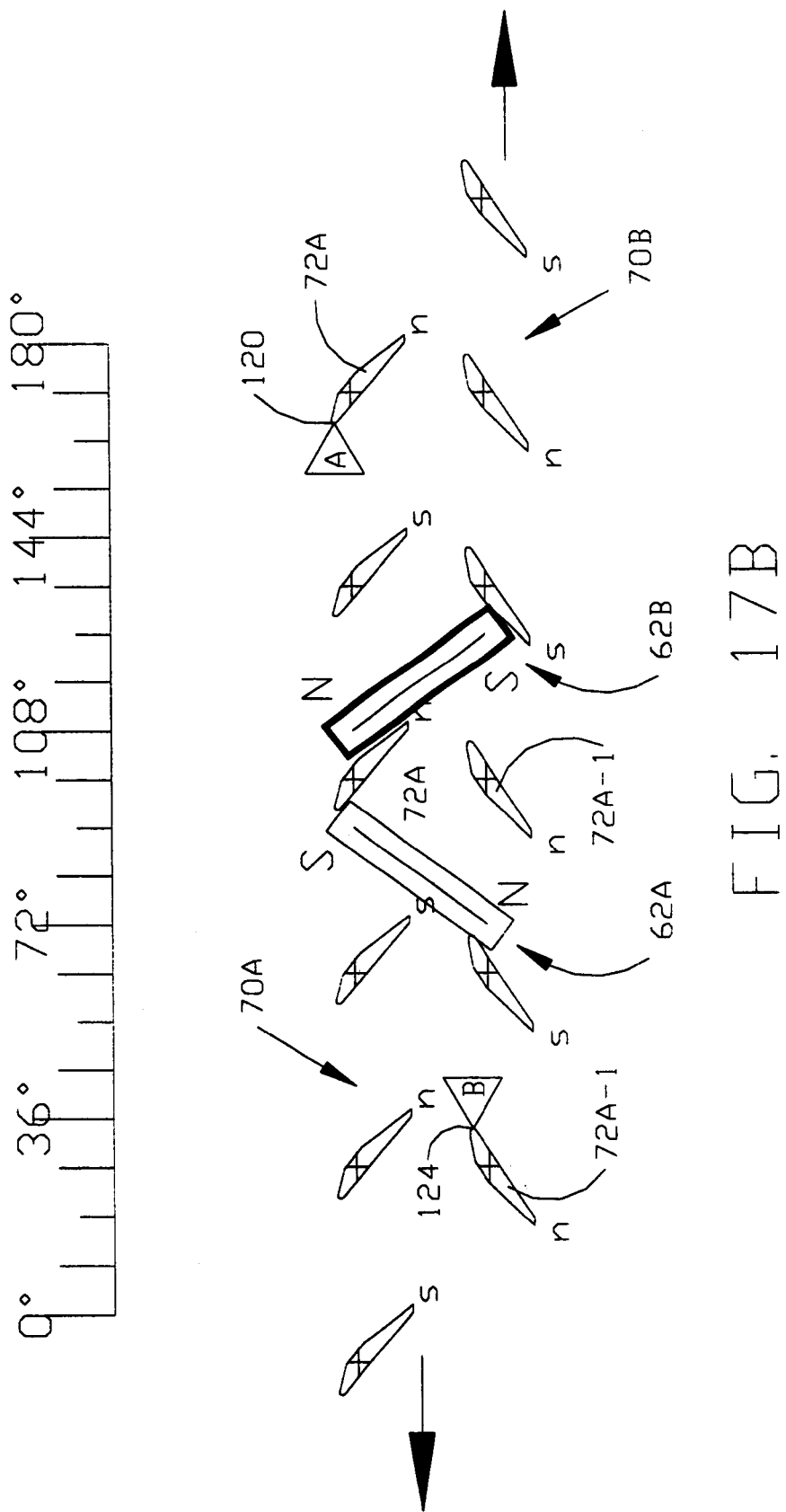
Figure 17C:
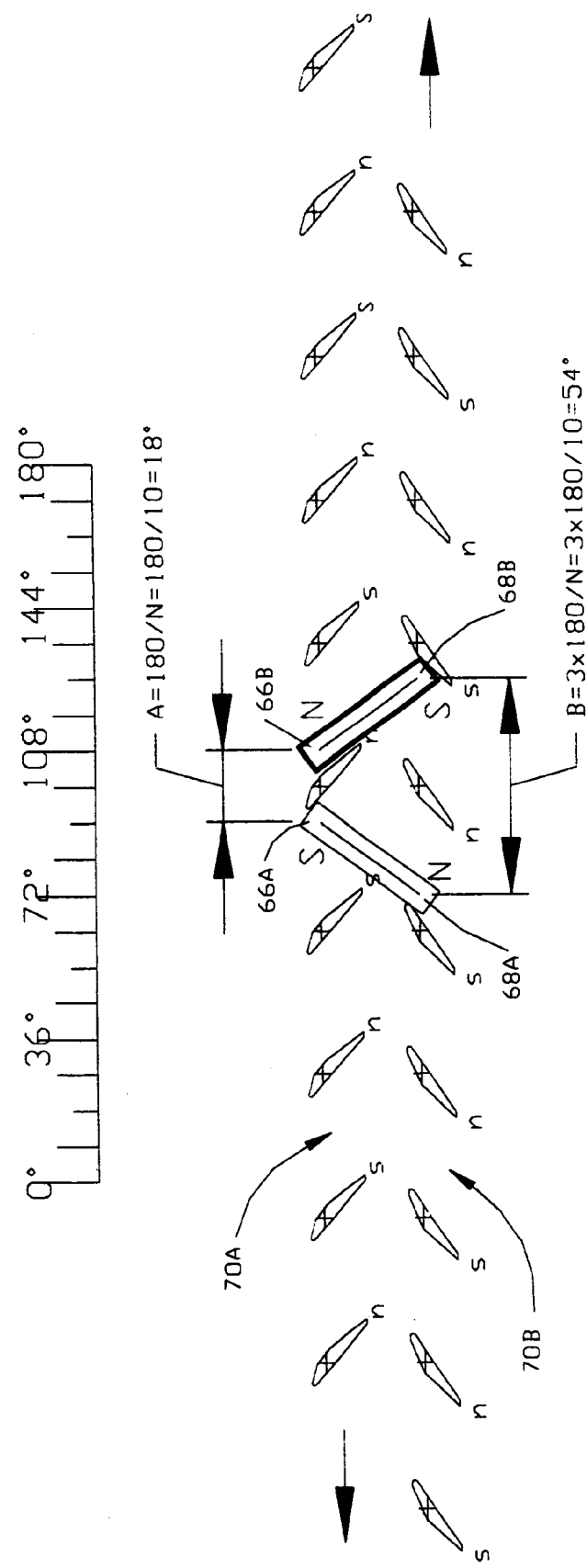

FIG. 17C is a diagram representation as in FIGS. 17A, 17B indicating the formula parameters for calculating the angles between core leg sets associated with each impeller.

Figure 18A:
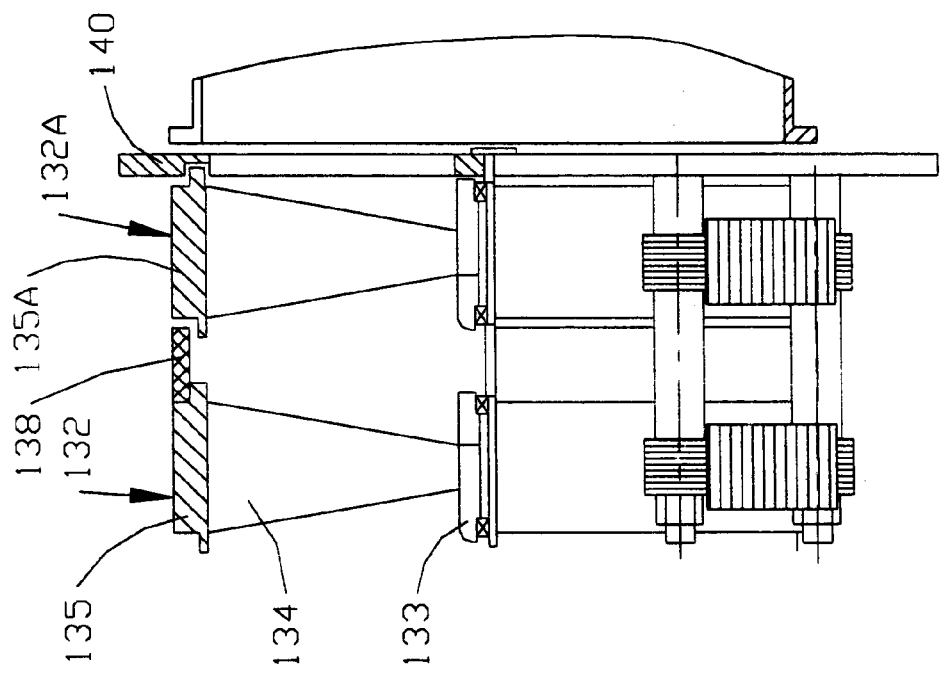
Figure 18:
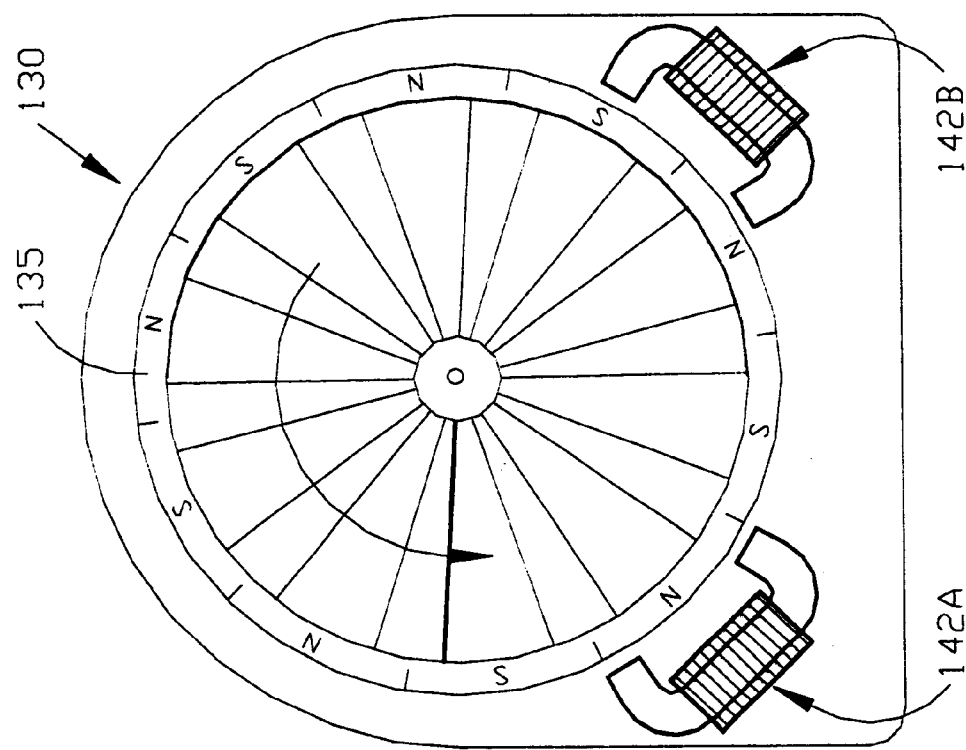

FIG. 18 is an end view of another form of the device according to the invention in which a ring is attached to the impeller blade tips. The ring is magnetized with adjacent segments having opposite polarities.

FIG. 18A is a lengthwise sectional view of the form of the device shown in FIG. 18.

FIG. 19 is a partial longitudinal sectional view of another form of the device utilizing independently rotatable impellers and a set of intermediate stator blades.

FIG. 20 is a partial longitudinal sectional view of the form of the type of device shown in FIG. 19 but with the impellers fixed to a support shaft to rotate together.

Figure 21:
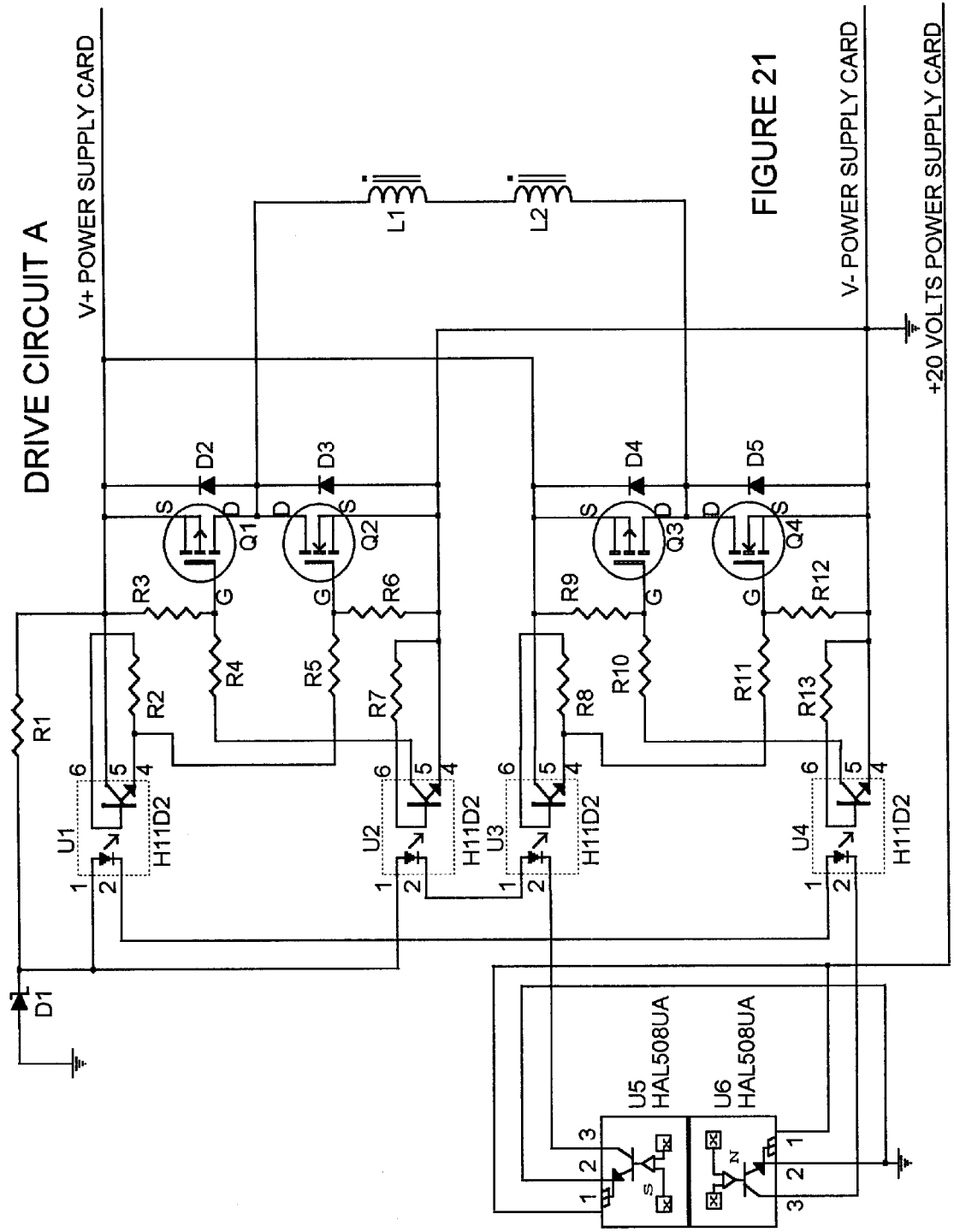
Figure 22:
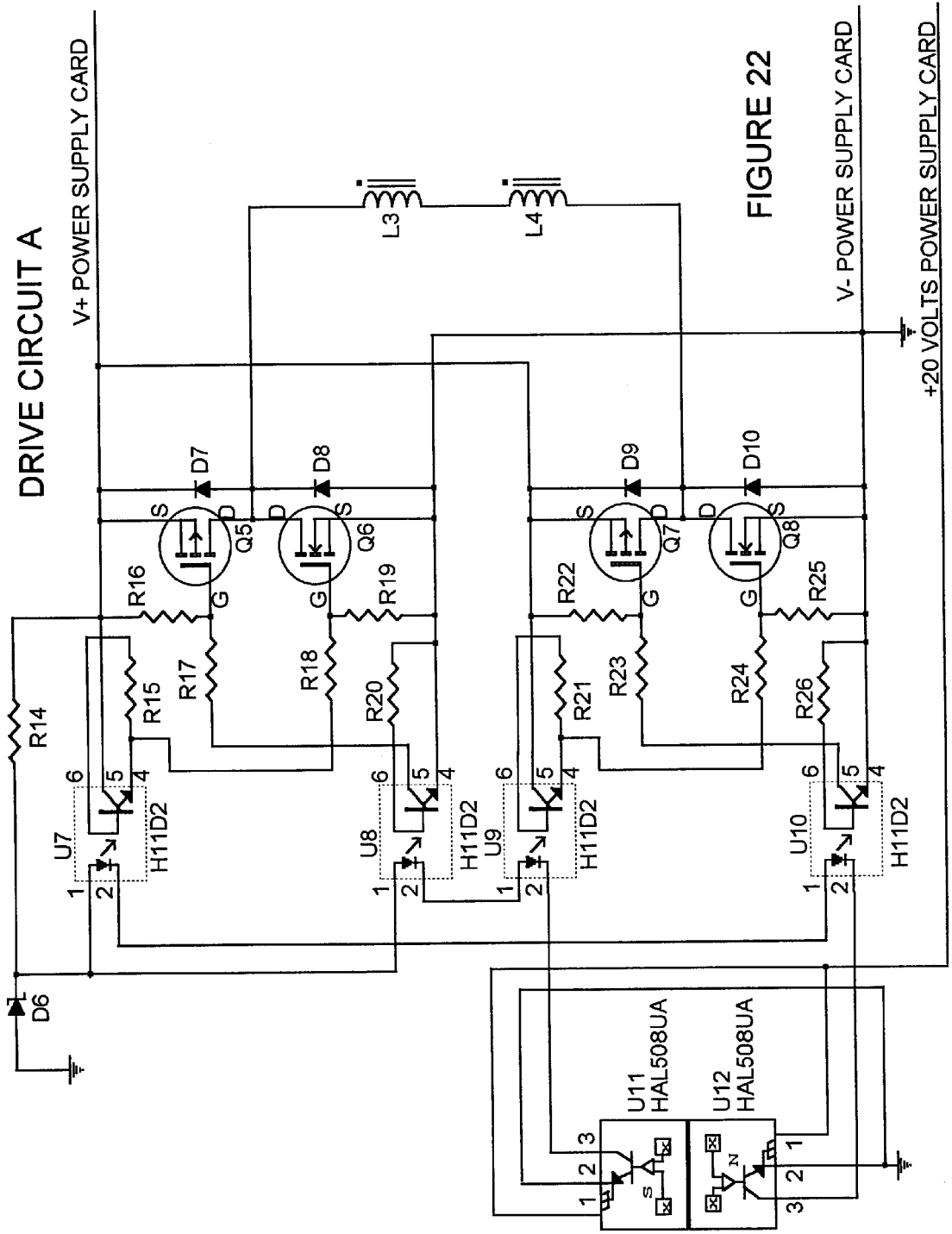
Figure 23:
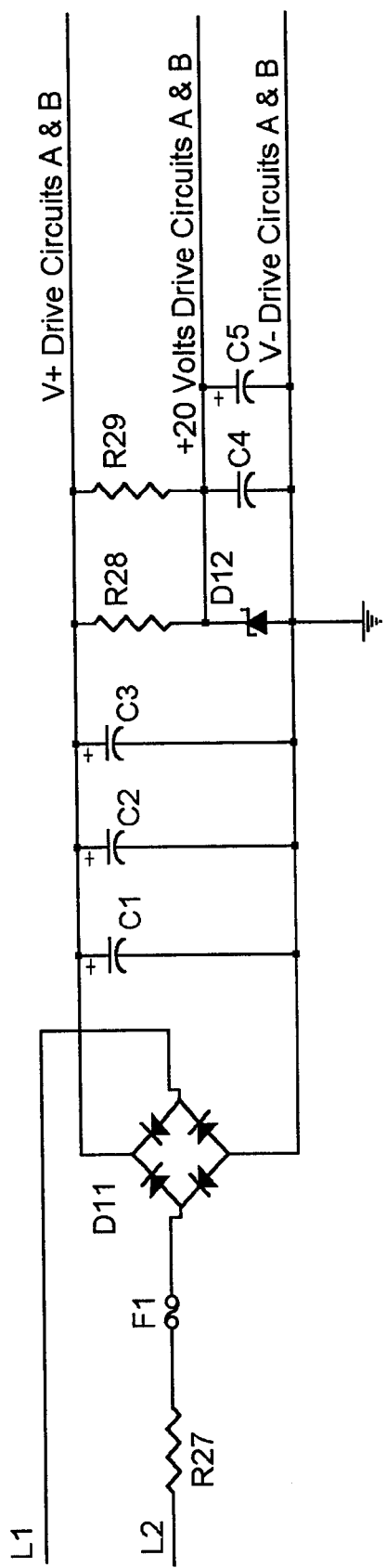

FIGS. 21–23 are schematic circuit diagrams of respective parts of the control circuit used to energize the electromagnetic driver coils.

Figure 24:
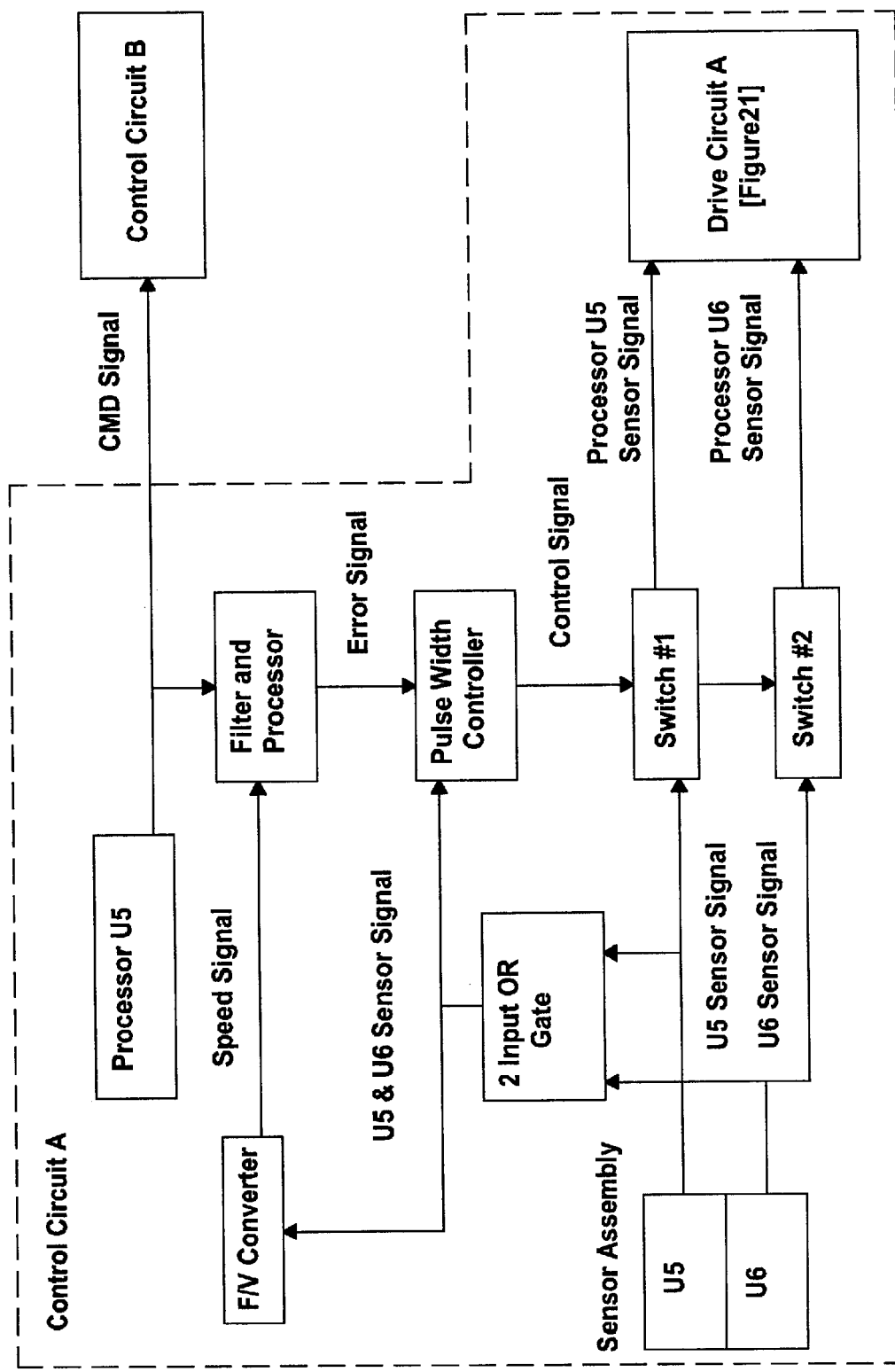
Figure 25:
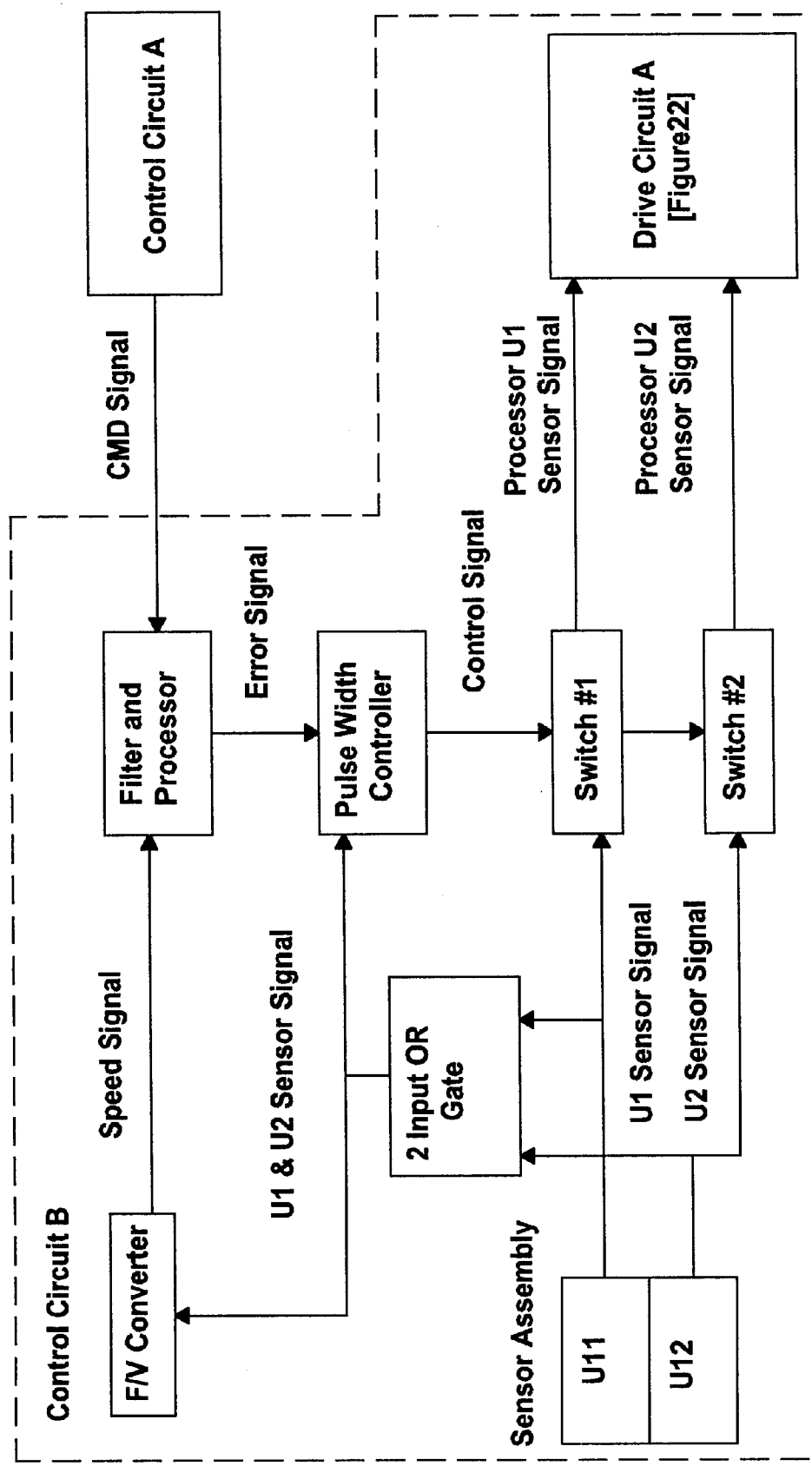

FIGS. 24 and 25 are block diagrams of a speed control circuit for each driver coil incorporated in the device according to the invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed in as much as the invention is capable of taking many forms and variations within the scope of the appended claims.

Figure 2:
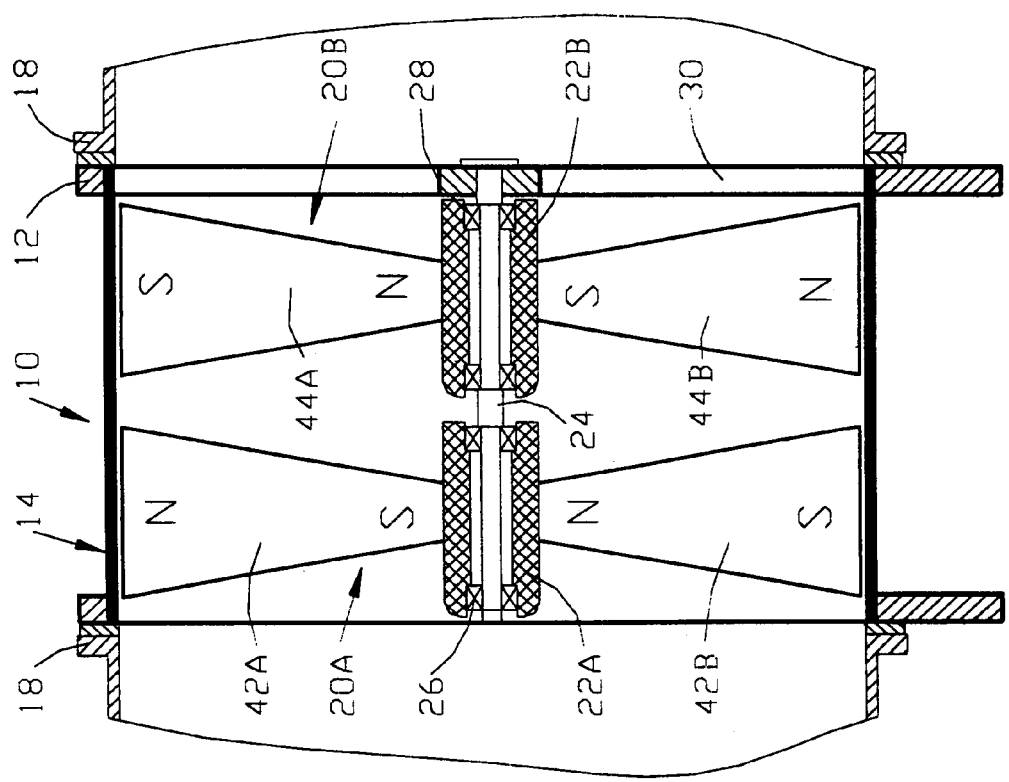
FIG. 2 is a longitudinal sectional view of the device shown in FIG. 1.
Figure 1:
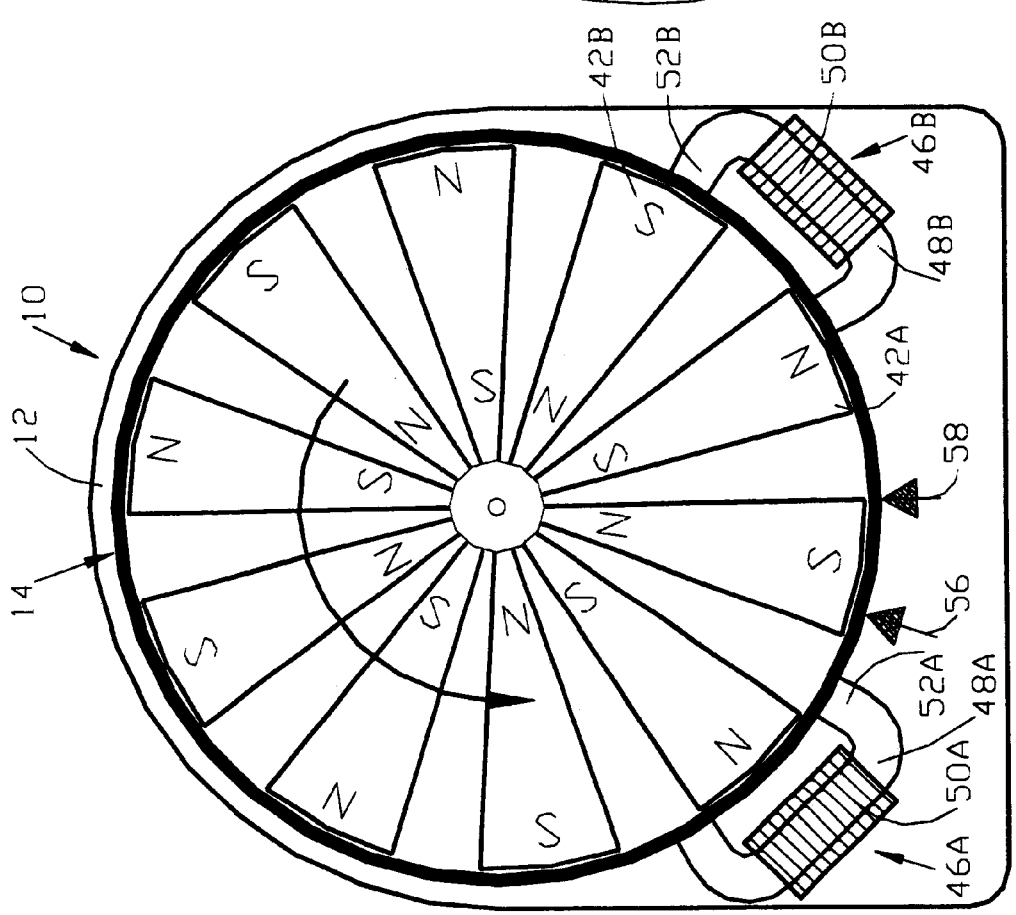
FIG. 1 is an end view of a fluid flow inducing device according to the invention utilizing a plurality of independently rotated impellers.

Referring to the drawings and particularly FIGS. 1 and 2, FIG. 1 shows basic arrangement of components of a fluid flow inducing device 10 which are similar to the device described in the aforementioned copending patent application cross referenced above. The device 10 includes a housing 12 having a fixed cylindrical shroud 14 defining an impeller enclosing structure providing a flow passage directing and receiving fluid flow to and from upstream and downstream conduits 18. The shroud 14 fully isolates the electrical components described herein from the fluid flowing therein. Rotatably supported within the shroud 14 is a pair of axially aligned impellers 20A and 20B instead of the single rotor described in the cross referenced copending patent application.

Each impeller 20A and 20B is supported by a corresponding central hub 22A, 22B, respectively, of magnetically conducting material which is rotatably supported on an axial shaft 24 and bearing sets 26 and 28. The axial shaft 24 in turn is supported by radial struts 30 of housing 12.

Each impeller 20A and 20B includes sets of radial blades 42A and 42B and 44A and 44B, respectively, angled to induce fluid flow when the impellers are rotated. The impeller blades 42A, 42B and 44A, 44B are integrally formed with the respective hubs 22A and 22B in the construction shown in FIG. 2. The material of these blades is selected so as to be magnetically conducting and also to be able to be permanently magnetized, preferably of a magnetic plastic material which is well known in the art. The permanent magnetization is such as to establish opposite magnetic poles as indicated at the radially inward most and the radially outermost end of each blade. The shroud 14 should be constructed of a nonmagnetic but magnetically permeable material such as a nonmagnetic plastic or stainless steel, although shroud holes 15 may alternatively be used (FIG. 1A), or recesses 17 (FIG. 1B).

Associated with each impeller 20A and 20B is a pair of electromagnetic driver coils 46A and 46B acting as a motor stator element. A respective pair of electromagnetic driver coils may be provided for each impeller, however, as shown in FIG. 4, a single pair of driver coils may be used to drive two impellers as will be described herein. Each driver coil 46A and 46B includes a horseshoe-shaped core 48A and 48B with coil windings 50A and 50B encircling the connecting segment joining ends of each of a pair of generally radial legs 52A and 52B.

The ends of the leg's 52A, 52B are closely spaced to the magnetized blade ends, i.e., 1/16 to 1/4 inches to provide a magnetic flux path through the blades and driver coil cores.

The circuitry (FIGS. 21–25) has generally similar components as the circuit described in the above cross-referenced copending patent application. As will be described hereinafter, these components include all sensors which establish trigger points 56 and 58 detecting when the edge of a respective impeller blade 42A and 42B rotates past that respective sensor point 56 and 58. The drive circuitry A and B (see FIGS. 21–22) causes momentarily or pulsed energization of each electromagnetic drive coil 46A and 46B to alternately generate opposite magnetic field polarities when the windings 50A or 50B are energized with the electrical circuit 54 such as to provide driving impulses on the blades 42A, 42B, 44A, 44B tending to produce sustained rotation of the respective impellers 20A and 20B. This will be described below in further detail.

The impellers 20A and 20B are preferably independently rotatable and the control circuitry associated with each of the impellers 20A or 20B, according to one embodiment, is designed to produce an opposite rotation of each such that driving impellers 20A or 20B generates an increased static pressure. Each impeller 20A, 20B has its own associated circuit to cause the respective impellers 20A, 20B to rotate in opposite directions as will described hereinafter in further detail.

As mentioned in the above cross referenced copending patent application, each horseshoe-shaped core 48A, 48B of the driver coils 46A, 46B produces sufficient magnetic forces such that only a single coil 46 can be relied on if the flow requirements for the particular application can be produced adequately by the drive force of a single driver coil 46 (see FIG. 3). It is still necessary to orient the blades of the impeller 20 during a start up position to ensure that rotation in the proper direction will begin and will proceed.

To initiate operation, one impeller blade must be positioned between the core legs 52. To do this, another blade is attracted to a start up coil 60 and aligned with the magnetic pole of that coil.

In FIG. 1, which represents a start up position, each of two blades 42A, 42B are naturally attracted to the respective core legs 52B. The angle between the core legs 52A, 52B is set to be the same as the angle between successive blades to produce this condition. The spacing of the blades 42A, 42B and the angle between the coils 46A, 46B causes a blade 42A to be positioned between the legs 52A in the start up position.

FIG. 1C shows a 90° angle spacing C between the driver coils 46A, 46B. The angle C in degrees can be calculated using the formula:

$$C = 180(2k+1)/N + 360f/N$$

where N is equal to the number of permanently magnetized blades, and k and f are any whole numbers.

Instead of two respective sets of driver coils 46A, 46B (FIG. 1) for each impeller 20A, 20B (FIG. 2) it may be advantageous to provide a single pair of electromagnetic driver coils 62A, 62B as shown in FIGS. 4, 5, 17A, 17B with cores 64A, 64B lying in planes, which are axially skewed to position each leg 66A, 668, 68A, 68B, associated with respective impeller planes 70A, 70B, as indicated in FIG. 5. The skewing of the driver coils 62A, 62B is required for producing reverse rotation as explained below. Thus, each electromagnetic driver coil 62A, 62B interacts with the magnetic fields produced by magnetized impeller blades 72A, 72B. This has an advantage, over the use of two separate pairs of driver coils, by rendering synchronization between the relative rotational rates of the impellers 70A, 70B much easier. A drive circuit is provided for each respective driver coil 62A, 62B.

One core leg from each driver coil 62A, 62B forms a respective set of core legs 66A, 66B and 68A, 68B each set associated with a respective impeller 70A, 70B.

FIGS. 4 and 17C show that the set 66A, 66B form an angle A in the impeller plane 70A, while set 68A, 68B form an angle B in the impeller plane 70B. These angles may be calculated with the formulas:

$$A = 180/N$$
$$B = 3 \times 180/N$$

where N is the number of magnetized impeller blades.

FIGS. 6–9 show an alternative construction; in which instead of the impeller blade tips defining one pole of a permanent magnetic field there is an arcuate ring segment integral with each impeller blade. Blades 80A, 80B with the ring segments 78A, 78B defining one of the radially spaced magnetic poles created by magnetization of the blades and segment pieces together.

In order to simplify the magnetization process for permanently magnetizing the blade ring segment sections, the impellers 84 and 86 are preferably constructed in two different sections 109 and 110 as shown in FIGS. 8 and 9, respectively. The hub sections 112, 114 are notched to be able to be interleaved when assembling the sections 109, 110 together to form the complete impeller. It is easier to magnetize all portions of one section to be the same polarity, and accordingly the two-section construction is easier to manufacture.

The ring segments 78A and 78B are interfit after assembly such as to define a sealed cylindrical fluid containment passage 82. A second impeller 86 axially spaced from the first impeller 84 also has arcuate ring's segments 90 integrally formed with each blade 92 which are magnetized with successively opposite polarities as in the first impeller 84. At axially projecting edge portions 94 are attached nonmagnetic ring 96 such as to create a labyrinth seal to confine the fluid flow within the interior of the ring segments 78 and 90. Likewise, an end lip 98 on each of the segments 90 closest to a housing sidewall 100 fits into a recess therein to create a labyrinth seal.

Thus, there is no stationary shroud as such in this form of construction. Pairs of mounting posts 102 and 104, project axially from the end plate 100 to support the respective sets of driver coils 106 and 108.

FIGS. 10–13 show an alternate construction in which impellers 116, 118 do not have the arcuate segments and are formed into sections shown in FIGS. 12 and 13 in which each of the fan blades 120 in one piece 122 are all polarized in the same orientation, i.e., the south poles at the blade tips and the north poles at the blade roots adjacent a tooth hub 124. The blades 128 of another piece 126 are all of the opposite polarity with the north pole at the outer tip and the south pole at the root adjacent the tooth hub 130, each hub segment 124, 130 are interfit to allow the blades 120 and 128 to be alternately disposed.

The bearings 132 and 134 are received within the composite hub formed by the segments 124, 130, and disposed on the stepped support shaft 138 supported by struts 140 included in the housing 142.

FIGS. 14A–14D show each stage of a basic operation of the device having a magnetic drive according to the present invention for impellers 20A, 20B rotating in the same direction. At start up, the driver coil 46A has one of the impeller blades 42A positioned between its core legs 52A, B by a previous energization of the other coil 46B causing successive blades 42A, 42B to line up with each core leg as shown. Sensor location 58 has been reached by an impeller blade 42B having an opposite magnetic polarity to the blades 42A. The components within the drive circuit, in response thereto, causes the driver coil 46A to be momentarily energized with the circuit, establishing the magnetic polarity indicated, which causes the blade 42A positioned between the legs of the coil 46A to be attracted to the south pole and to be repelled by the north pole, both effects inducing a counterclockwise rotation of the impeller 20A, 20B. Coil 46A is turned off immediately after the blade edge passes the sensor location.

Figures 14A, 14B:
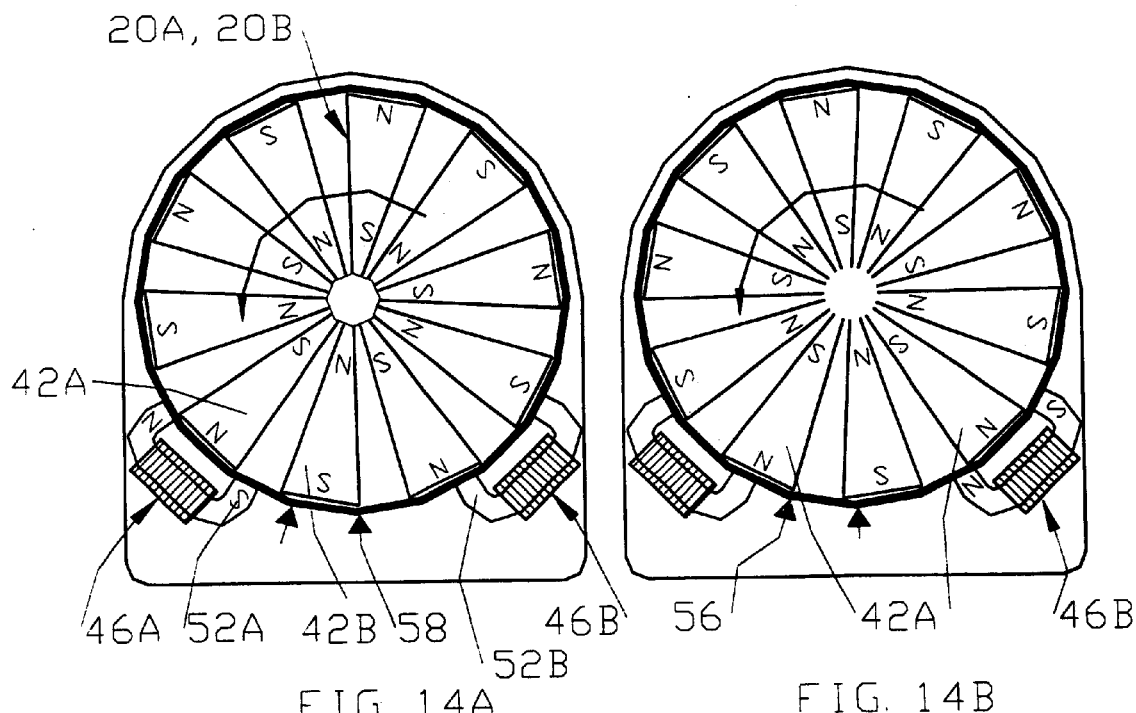
FIGS. 14A–14D are end view diagrams of the axial fluid flow inducing device, indicating the magnetic drive of the impellers by identically controlled energization of respective pairs of electromagnetic driver coils.
Figures 14C, 14D:
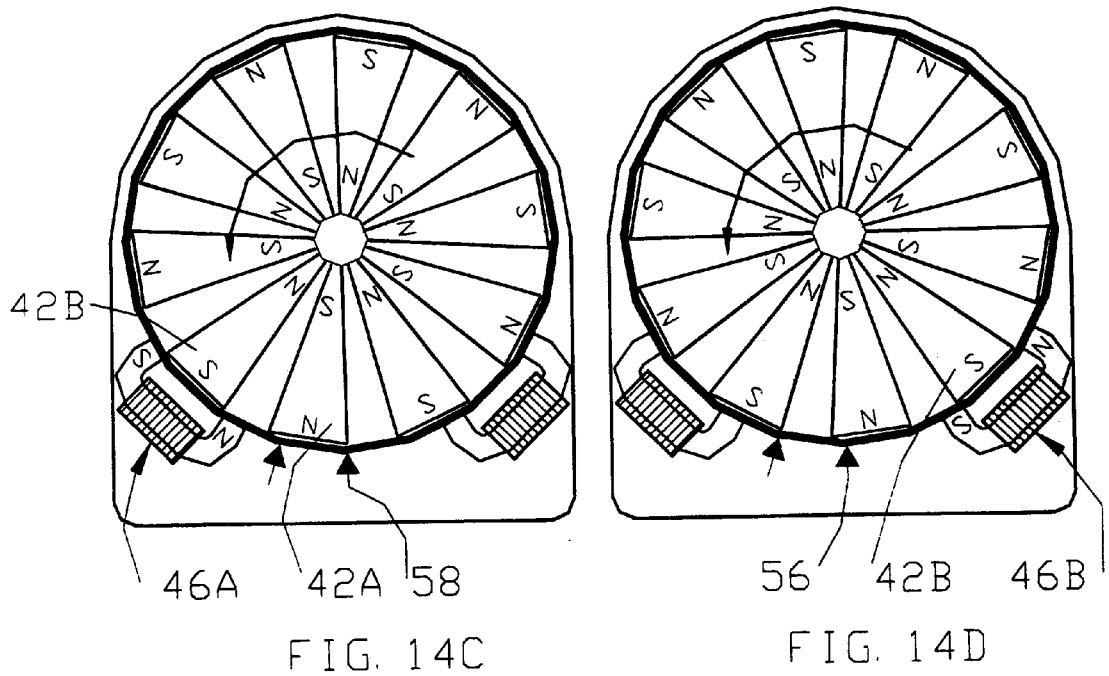
Figure 16D:
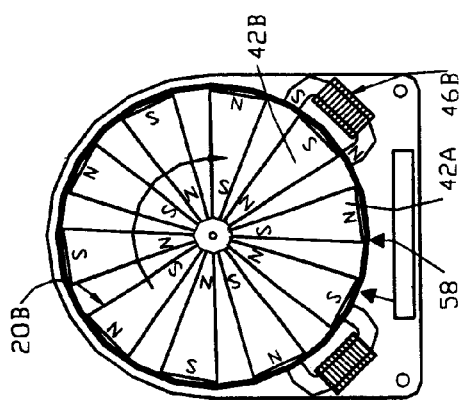
FIGS. 16A–16D are end view diagrams of a second impeller of a multistage device indicating energization of a pair of driver coils and the relationship with the magnetized tip of impeller blades to achieve rotation in an opposite direction to the first stage of FIGS. 15A–15D.

After turnoff of coil 46A, the impellers 20A, 20B coasts in the counter clockwise direction until, the second sensor, location 56 is reached by a leading edge of an impeller blade 42A (FIG. 14B The control circuitry then causes the other driver coil 46B to be energized in such a way as to establish the polarity indicated. At this point, a north impeller blade 42A is positioned between the legs of the core and coil 46B, and this again causes attraction with impeller blade 42A, tending to continue the counterclockwise rotation of the impeller 20A, 20B.

The coil 46B is deenergized and the impeller 20A, 20B continues to coast forward until the impeller blade 42A reaches the second sensor location 58 (FIG. 14C), which again triggers energization of the driver coil 46A but with an opposite polarity. At this point, one of the south oriented blades 42B is positioned between the legs of the driver coil 46A causing attraction propulsion forces to be exerted on the impeller 20A, 20B, continuing a counterclockwise rotation of the impeller 20A, 20B. The coil 46A is again deenergized (after the interval described), and the impeller 20A, 20B continues rotation until the blade, 42B reaches the second sensor location 56 (FIG. 14D) which triggers reenergization of the other driver coil 46B. At this point, another south orientated impeller blade 42B is positioned between the legs of the driver coil 46B, again setting up attraction repulsion magnetic forces tending to continue rotation of impellers 20A, B in a counter clockwise direction. This is similar to the arrangement described in the copending application cross-referenced above, except that two impellers 20A, 20B are involved, and the circuit may be designed to produce different rates of rotation.

The frequency with which the blades 42A, 42B sweep past the sensor locations 56, 58 maybe monitored to measure rotational speed and to control the speed of each impeller 20A, 20B with appropriate additional circuitry.

Figure 15D:
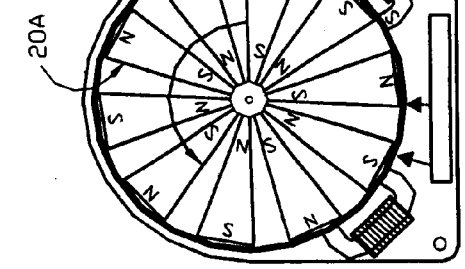
FIGS. 15A–15D are end view diagrams of a first impeller of a multistage device indicating energization of a pair of driver coils and the relationship of the magnetized tip impeller blades to achieve rotation of a first stage impeller in one direction.
Figure 15A:
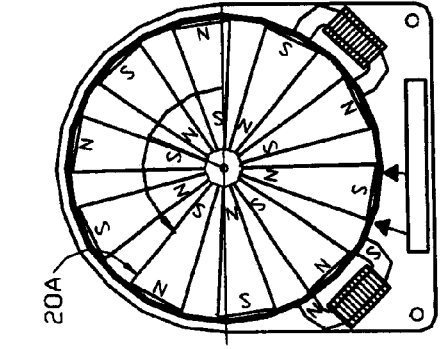

FIGS. 15A–15D and 16A–16D show the operating cycle for the respective impellers 20A and 20B for a counter rotating drive of each. FIGS. 15A, 15D show an arrangement that is the same as that shown in FIGS. 14A–14D, thus producing counterclockwise rotation of impeller 20A.

In FIGS. 16A–16D, the start up condition of the impeller 20B has a south blade 42B positioned between the legs of the driver coil 46A and a north blade 42A at a point triggering sensor 56 rather than the sensor 58. The circuitry causes the driver coil 46A to be energized with the polarity indicated upon a blade 42A reaching the sensor location 56. This causes initiation of a clockwise rotation of impeller 20B by attraction-repulsion of the magnetic fields.

Figure 16C:
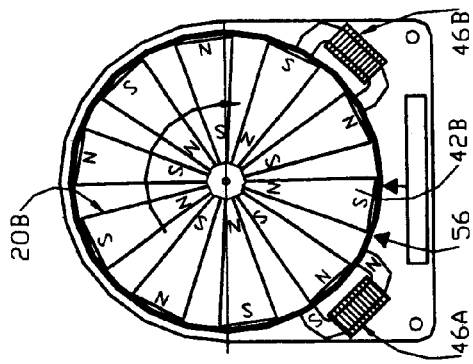
Figure 15C:
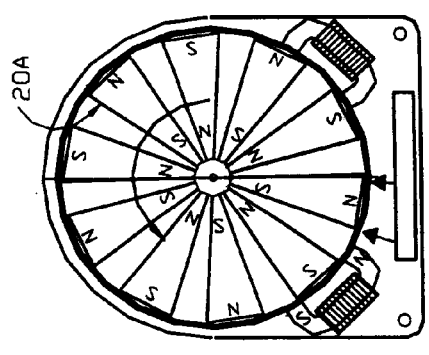
Figure 16B:
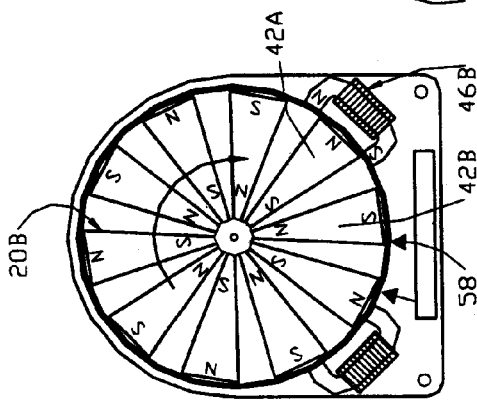
Figure 15B:
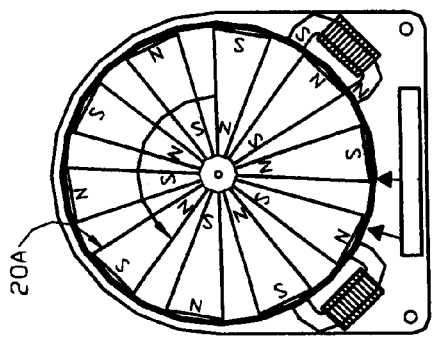
Figure 16A:
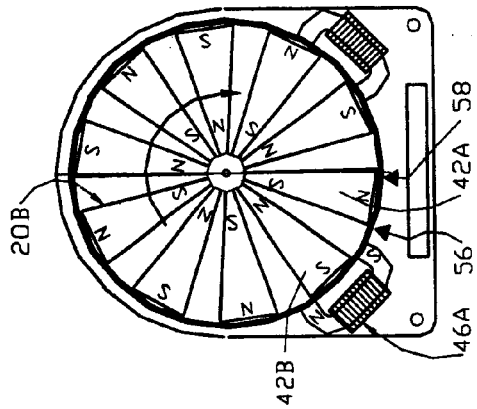

In FIG. 16B, the sensor location 58 is reached by the leading edge of an impeller blade 4213, triggering energization of the driver coil 46B with the magnetic polarity indicated, which is opposite the magnetic polarity of coil 46A in FIG. 16A. This acts on the magnetic field of the impeller blade 42A positioned between the legs of the driver coil 46B to continue to force the impeller 20B to rotate clockwise, in the opposite direction from that of the other impeller 20A.

FIG. 16C shows blade 42B reaching the detector location 56 (coasting thereto after the prior turn off of the driver coil 46B), the driver coil 46A is then activated with an opposite polarity from when first activated, with a "north" blade 42A positioned between the legs of the core. Attraction repulsion forces generated by the interacting magnetic fields continues to force the impeller 20B in the clockwise rotation. The driver coil 46A is then turned off (FIG. 16D) and the impeller 20B continues to coast forward until an impeller blade 42A reaches the first sensor location 58. This causes the circuitry to energize the second driver coil 46B with the magnetic fields indicated, which interacts with the magnetic field of the impeller blade 42B to create repulsion attraction forces that continue clockwise rotation of the impeller 20B.

Thus, the two impellers 20A, 20B rotate in opposite directions and enable the development of a desired static pressure without requiring complex mechanical drives.

FIGS. 17A and 17B illustrate the functioning of the skewed coil drivers 62A, 62B shown in FIGS. 4 and 5. One sensor A is located in the phase of impeller 70A and a second sensor B in the plane of impeller 70B. As one of the south oriented impeller blades 72B reaches an "on" trigger point 120 of sensor A, the driver coil 62A is energized with the polarity indicated. Simultaneously, a south impeller blade 72B-1 reaches a trigger sensor point 124 of sensor B, causing the driver coil 62B to be energized. At this point, a south oriented impeller blade 72B is between the legs of the drivers coil 62A and 62B attracted the north pole of the driver coil 62A and repulsed by south pole of the driver coil 62B urge to rotate in a left hand or counter clockwise direction of the impeller 70A. At the same time, a south oriented blade 72B-1 of the impeller 70B is between the legs of driver coils 62A and 62B repulsed the south pole of the driver coil 62A and attracted by the north pole of the driver coil 62, thereby being forced to rotate in a righthand direction or clockwise rotation of the impeller 70B.

As the impeller blade 72B reaches an "off" sensor location 122 of sensor A, the driver coil 62A is turned off. Similarly, as the impeller blade 72B-1 of the impeller 70B reaches the second off location of sensor B simultaneously, the driver coil 62B is de-energized. The impellers 70A, 70B continue to coast until the blades reach the location in FIG. 17B whereat the next trailing impeller blade 72A-1 reaches "on" location 124 of sensor B, causing energizing of the driver coil 62B and an impeller blade 72A of the impeller 70A reaches the "on" location 120 of the sensor A which causes the energization driver coil 62A in a reversed polarity from the previous cycle.

At this point, (see FIG. 17B) a north oriented impeller blade 72A is between the legs of the drivers coil 62A and 62B. The impeller 70A is attracted to the south pole of the driver coil 62A and repulsed by the north pole of the driver coil 62B, which forces impeller 70A to rotate in a left hand or counter clockwise direction. At the same time, a north oriented blade 72A-1 of the impeller 70B is between the legs of driver coils 62A and 62B. This impeller 70B is repulsed by the north pole of the driver coil 62A and attracted by the south pole of the driver coil 62B, thereby being forced to rotate in a righthand direction or clockwise rotation.

FIGS. 18 and 18A show another form of an axial flow inducing magnetically driven device 130 according to the present invention in which a solid impeller 132 includes a hub 133, blades 134 and ring 135. Ring 135 is permanently magnetized in segments with alternating opposite polarities as shown.

An axial sealing labyrinth is established between ring 138 and ring 135A. A similar sealing labyrinth is established between ring 135A and housing 140.The angulary spaced driver coils 142A, 142B, operated as in the first embodiment described above, are mounted to a housing 140 to be positioned radially outside the rings 135, 135A.

FIG. 19 shows a device 144 which has two independently rotatable impellers 146A, 146B straddling a stator blade set 148 fixed in a housing 150. FIG. 20 shows a device 152 which has two impellers 154A, 154B having hubs 158A, 158B fixed to shaft 156 to rotate together. A set of stator blades 160 is mounted between impellers 154A, 154B.

The electrical control, is shown in FIGS. 21–23 showing drive circuit A for one driver coil, drive circuit B for the second driver coil, and a power supply circuit, respectively.

The power supply circuit receives 115 volts ac from a standard grounded electrical power cord. This voltage is rectified by D11 and filtered by C1, C2 and C3. The current is limited by R27 to approximately 8 amperes and protected by F1, a 1.5 amp slow blow fuse. This rectified voltage, measured from V+ to V−, is applied to the drive cards and measures approximately 160 volts do under nominal load. R28 and R29 in conjunction with D12 provide 20 volts do used to power the Hall Effect IC's on both drive circuits. C4 and C5 provide filtering for this 20 volt @ 20 milliamp power source.

Drive circuits A and B are identical and electrically function the same with the exception of the location of their respective sensors and driver coils. Drive circuit A will be used to describe the operation of the drive electronics.

As can be determined by reviewing drive circuit A, the components in each circuit includes a pair of uni-polar Hall effect IC's, U5 and U6, of a commercially available type. The IC's are mounted in close proximity to one another, and comprise a sensor assembly. Each sensor is placed at a precise position and is energized by the leading edge of each blade. The duration of how long the sensor stays energized is determined by the rotor speed and blade tip exposure. When one of the impeller blades having an outer south pole aligns with the sensor, U5 conducts supplying a ground to pin #3. This in turn causes U2 and U3 to energize allowing their outputs to conduct. U2 applies a voltage potential to the gate of Q1 through the voltage divider formed by R3 and R4. This applied voltage potential-is approximately 140 volts do referenced to V−. At the same time U3 applies a voltage potential to the gate of Q4 through the voltage divider formed by R11 and R12.

This applied voltage potential is approximately 20 volts do referenced to V−. Q1 and Q4 are powered on and a high current conduction path is established from the V+ supply through Q1, L1, L2 and Q4 to ground. L1 and L2 are now energized to create a magnetic field causing the rotor to rotate.

When one of the impeller blades having an outer north pole aligns with the sensor, U6 conducts supplying a ground to pin #3. This in turn causes U1 and U4 to energize and allowing their outputs to conduct. U1 applies a voltage potential to the gate of Q2 through the voltage divider formed by R5 and R6. This applied voltage potential is approximately 20 volts do referenced to V−. At the same time U4 applies a voltage potential to the gate of Q3 through the voltage divider formed by R9 and R10. This applied voltage potential is approximately 140 volts do referenced to V−. Q2 and Q3 are powered on, and a high current conduction path is established, from the V+ supply through Q3, L2, L1 and Q2 to ground. L1 and L2 are now energized and create a magnetic field of opposite polarity as when U5 conducted.

Resistors R2, R7, R8 and R13 are used only for biasing off the transistor outputs on U1 through U4. The fast recovery rectifiers D2 through D5 clamp the transient voltages generated by L1 and L2 and prevent the reverse conduction of Mosfets Q1 trough Q4.

The following table lists details of the electrical components used in these circuits:

Electrical Component List
Multi-Stage axial Bladed Machine

| Component Designator | Component Type | Component Manufacturer | Component Part Number |
|---|---|---|---|
| D1 | Zener Diodes | Liteon Power Semiconductor | 1N4727 |
| D2–D5 | Fast Recovery Rectifiers | Liteon Power Semiconductor | 1N4936 |
| U1–U4 | Optoisolators | QT Optoelectronics | H11D2Z |
| U5, U6 | Hall Effect Sensor IC's | Micronas | HAL508UA |
| Q1, Q3 | P-Channel Mosfets | International Rectifier Corp. | IRF9640 |
| Q2, Q4 | N-Channel Mosfets | International Rectifier Corp. | IRF640 |
| R1 | 15 K, 3 Watt Power Resistor | NTE Electronics, Inc. | N/A |
| R2, R7, R8, R13 | 470 K, ½ Watt Resistor | N/A | N/A |
| R3, R6, R9, R12 | 15 K, ½ Watt Resistor | N/A | N/A |
| R4, R5, R10, R11 | 100 K, ½ Watt Resistor | N/A | N/A |
| L1, L2 | Field Coils | Air Concepts, Inc. | N/A |
| D6 | Zener Diodes | Liteon Power Semiconductor | 1N4747 |
| D7–D10 | Fast Recovery Rectifiers | Liteon Power Semiconductor | 1N4936 |
| U7–U10 | Optoisolators | QT Optoelectronics | H11D2Z |
| U11, U12 | Hall Effect Sensor IC's | Micronas | HAL508UA |
| Q5, Q7 | P-Channel Mosfets | International Rectifier Corp. | IRF9640 |
| Q6, Q8 | N-Channel Mosfets | International Rectifier Corp. | IRF640 |
| R14 | 15 K 3 Watt Power Resistor | NTE Electronics, Inc. | N/A |
| R15, R20, R21, R26 | 470 K, ½ 2-Watt Resistor | N/A | N/A |
| R16, R19, R22, R25 | 15 K, ½ Z Watt Resistor | N/A | N/A |
| R17, R18, R23, R24 | 100 K, ½ Watt Resistor | N/A | N/A |
| L3, L4 | Field Coils | Air Concepts, Inc. | N/A |
| R27 | 15 Ohm, 10 Watt Resistor | Xicon/Arcol | N/A |
| R28, R29 | 15 K 3 Watt Power Resistor | NTE Electronics, Inc. | N/A |
| F1 | 1% 2 Amp Slow Blow | Littlefuse | 313 Series 1.5 Amps |
| D11 | 6 Amp, Bridge Rectifier | Liteon Power Semiconductor | PB64 |
| D12 | Zener Diode | Liteon Power Semiconductor | 1N4747 |
| C1–C3 | 68 UF, 200 Volt Capacitors | Panasonic | E E U-EB2D680S |
| C4 | .047 UF, 100 Volt Capacitor | Panasonic | E Q U-V 1473JM |
| C5 | 50 UF, 50 Volt Capacitor | | |

In the above-described circuits, the Hall effect sensors are energized only while the blades are passing by each sensor.

Also, a speed control circuit could utilize the sensor signals to maintain a desired rate of rotation of the impellers.

Such speed control circuits are shown in the block diagrams of FIGS. 24 and 25 for the respective circuits A and B of FIGS. 21 and 22.

This speed control operates directly from the power supplied to sensors U5, U6 and U11, U12 from drive circuits A and B, respectively. The speed control is spliced in the line going to the sensors. The only item common to the two speed controls is the RPM command signal. This command signal is a voltage generated by a potentiometer, which represents a motor speed setting. FIG. 24 shows the RPM command signal originating in control circuit A and feeding to control circuit B. It may also be located in control circuit B and feed to control circuit A.

The speed control diagrams of FIGS. 24 and 25 are identical and electrically function the same with the exception that they each are associated with their respecting sensors and drive circuits. FIG. 24 will be used to describe the operation of the speed control. During start up or loading, sensor assembly U5, U6 operates switch #1 and #2 directly without modulation. This is done via a high state control signal in conjunction with the U5, and U6 sensor signal to switch #1 and #2, respectively. As the motor rotates, the U5, and U6 sensor signals are combined with a two input OR gate. This is done so both polarity blades are generating pulses to the FN converter (frequency X2) which will allow for tighter speed control. The FN converter processes the U5, and U6 sensor signal to a DC voltage representative of the frequency. As the frequency increases (motor RPM increases) the DC voltage increases in a linear fashion. This voltage is the speed signal, which will be filtered and used to control the motor speed. The speed signal is filtered by RC networks in the Filter and Processor block. After filtering, this signal is processed by a differential, integral, and proportional gain amplifier to monitor and control its rate of change. The signal is then summed with the RPM command signal in this amplifier to generate an error signal. This error signal is approximately 2.5 volts when the RPM command signal and RPM of the motor are the same. If the motor speed increases above the RPM command signal the error signal voltage decreases and increases if the motor speed decreases. This error signal is used to control the pulse width modulator, which modulates switch #1, or #2 if its sensor signal is a low state. The processed sensor signal, that is generated, is sent to drive circuit A (FIG. 21).

We claim:

1. An axial fluid flow inducing device comprising:

a housing;

a plurality of aligned impellers disposed within said housing, and each of said impellers mounted in said housing for rotation about a common axis;

each of said impellers having a series of radially extending blades;

a magnetically permeable enclosing structure surrounding said impellers and defining a fluid flow passage;

magnetic drive means for each impeller comprising impeller portions permanently magnetized so as to establish radially spaced magnetic poles, an outer pole of each portion located at an outer region of each impeller, each successive outer pole having an opposite polarity from each adjacent pole;

said magnetic drive means further including pulsed magnetic field generating means comprising electromagnetic driver coil means disposed adjacent an outer perimeter of each of said impellers, said pulsed magnetic field generating means establishing a magnetic field with a pole adjacent said outer poles of said magnetized portions of each of said impellers when energized with electrical power;

circuit means causing pulsed energization of said driver coil means so as to alternately cause opposite magnetic poles to be established thereby in timed relationship to rotation of said magnetized portions of said impellers to produce rotation thereof by magnetic attraction and repulsion;

wherein said impellers are mounted for independent rotation with respect to each other;

wherein said magnetic drive means interacts with each of said impeller magnetized portions to produce said independent rotation; and wherein one magnetic drive means causes rotation of two of said impellers in opposite directions.

2. An axial fluid flow inducing device comprising:

a housing;

a plurality of aligned impellers disposed within said housing, and each of said impellers mounted in said housing for rotation about a common axis;

each of said impellers having a series of radially extending blades;

a magnetically permeable enclosing structure surrounding said impellers and defining a fluid flow passage;

magnetic drive means for each impeller comprising impeller portions permanently magnetized so as to establish radially spaced magnetic poles, an outer pole of each portion located at an outer region of each impeller, each successive outer pole having an opposite polarity from each adjacent pole;

said magnetic drive means further including pulsed magnetic field generating means comprising electromagnetic driver coil means disposed adjacent an outer perimeter of each of said impellers, said pulsed magnetic field generating means establishing a magnetic field with a pole adjacent said outer poles of said magnetized portions of each of said impellers when energized with electrical power;

circuit means causing pulsed energization of said driver coil means so as to alternately cause opposite magnetic poles to be established thereby in timed relationship to rotation of said magnetized portions of said impellers to produce rotation thereof by magnetic attraction and repulsion;

wherein said magnetic drive means includes at least two angularly spaced electromagnetic driver coils for each impeller, each driver coil having a U-shaped core, said U-shaped core of each driver coil having a pair of legs extending generally radially, a pair of angularly spaced electromagnetic driver coils mounted around the outer perimeter of each impeller; and said core legs of each driver coil extend at an angle to each other which is the same as an angle between successive blades of each impeller.

3. The device according to claim 1 or 2 wherein said housing includes a magnetically permeable shroud comprising said enclosing structure defining a fluid flow passage.

4. The device according to claim 3 wherein said shroud is constructed of plastic.

5. The device according to claim 3 wherein said shroud is constructed of stainless steel.

6. The device according to claim 3 wherein said magnetic field generating means includes a U-shaped core for said electromagnetic coil, said core having a pair of legs, and wherein said shroud includes an opening for each of said driver coil core legs.

7. The device according to claim 3 wherein said magnetic field generating means includes a U-shaped core for said electromagnetic coil, said core having a pair of legs, and wherein said shroud includes a recess for each of said driver coil core legs.

8. The drive according to claim 3 wherein said housing completely defines said enclosing structure defining said flow passage.

9. The device according to claim 3 wherein said enclosing structure fully isolates said pulsed magnetic field generating means and said circuit means from fluid in said fluid flow passage.

10. The device according to claim 1 or 2 wherein said magnetized portions of each of said impellers comprise a series of impeller blades, each magnetized such as to establish a magnetic pole on an outer tip of each of said blades.

11. The device according to claim 10 wherein said impeller blades extend radially from a hub, and wherein another pole is radially inwardly spaced from said pole at each blade tip, each successive blade having oppositely oriented poles from each adjacent blade.

12. The device according to claim 1 or 2 wherein said impellers are each constructed of magnetizable material.

13. The device according to claim 1 or 2 wherein each impeller is constructed of magnetically conducting and magnetizable plastic.

14. The device according to claim 1 or 2 wherein each impeller includes a hub connected to said impeller blades.

15. The device according to claim 14 wherein said hub is of a magnetically conducting material.

16. The device according to claim 14 wherein said blades are formed of magnetically conducting material, and able to be permanently magnetizable.

17. The device according to claim 1 or 2 wherein each impeller comprises two interfitting impeller sections, each section comprising a plurality of radially extending blades, each blade magnetized to define radially spaced apart poles having the same orientation, each subpart being magnetized with said poles of opposite polarity from the other impeller subpart, said sections interfit together with alternating impeller blades to establish alternating magnetic polarity of successive blades in said impeller.

18. The device according to claim 17 wherein said blade comprises arcuate segment at outer end, said arcuate segments form a ring after assembling said subparts.

19. The device according to claim 18 wherein said ring formed by said arcuate segments of each impeller have a labyrinth seal formed with an adjacent impeller and an adjacent housing portion to form said flow passage.

20. The device according to claim 17 or 18 wherein each subpart is constructed of magnetically conducting and magnetizable plastic.

21. The device according to claim 1 or 2 wherein said impeller includes a hub, blades and an annular ring extending around outer radial edges of said blades, and said annular ring comprises permanently magnetized segments, and each successive segment has opposite polarity.

22. The device according to claim 21 wherein said annular ring of each impeller has a labyrinth seal with an adjacent impeller and an adjacent housing portion to form said flow passage.

23. The device according to claim 1 or 2 wherein said blades are magnetized partially at outer ends.

24. The device according to claim 1 wherein said pulsed magnetic field generating means comprises at least two electromagnetic driver coils, each having a U-shaped core formed by a connected pair of legs, said U-shaped core inclined at an angle to said rotation axis of said impellers, one leg from each pair of legs positioned at an outer perimeter of a respective first and second of said impellers to provide a set of core legs associated with each impeller comprised of one leg from each core.

25. A device according to claim 24 wherein each set of said core legs positioned at a respective impeller perimeter, extends at a respective angle A and angle B, equal to:

$A = 180/N°$—at the first impeller perimeter;

$B = 3 \times 180/N°$—at the second impeller perimeter;

where N is the number of permanently magnetized impeller blades.

26. The device according to claim 2 wherein said impeller blades are spaced relative said two driver coil core legs so that when one blade is centered between said core legs of one driver coil, two successive blades are aligned with respective legs of the core of the other driver coil.

27. The device according to 26 wherein there is an angle C between the center of said two driver coils equal to:

$C \text{ (in degrees)} = 180(2k+1)/N + 360f/N$ where N is the number of permanently magnetized blades of each of said impellers;

and, k and f are any whole numbers.

28. The device according to 26 wherein said driver coils of two adjacent impellers placed along rotation axis, or shifted divisibly by angle between two blades, to provide position of blades between said core legs of pair of driver coils of adjacent impellers at start up position; said pair of first driver coils are energized by switching at start up so as to establish opposite magnetic polarity while blades between said core legs are the same polarity, or so as to establish the same polarity while said blades are opposite polarity; second driver coil of the pair associated with first impeller is energized so as to establish opposite magnetic polarity relatively to the first one at the second switching; second driver coil of the pair associated with second impeller is energized so as to establish the same magnetic polarity relatively to the first one at the second switching to rotate adjacent impellers in opposite directions.

29. The device according to claims 24 or 2 wherein said core legs each have an end closely spaced radially from each outer pole of said impeller portions, a distance in the range $\frac{1}{16}$ to $\frac{1}{4}$ inch.

30. The device according to claim 2 wherein said circuit means includes a pair of sensors associated with each pair of driver coils of each impeller, each sensor detecting impeller blade positions to briefly cause energization of said respective each driver coils.

31. The device according to claim 30 wherein one sensor of each of said pairs of sensors associated with each impeller is located to sense the position of an impeller blade tip between the core legs of one of said driver coils in each pair of driver coils, and said circuit means briefly energizes said one driver coil in response thereto, to cause impeller rotation in a predetermined direction, and the other of said sensors in each pair is located to sense the position of a succeeding blade tip between the core legs of the other driver coil in each pair of driver coils, and said circuit means causes said other driver coil to be briefly energized so as to cause continued impeller rotation in said predetermined direction.

32. The device according to claim 24 wherein a sensor is associated with each impeller sensing when an impeller blade of each impeller is between the core legs of two adjacent driver coils and said circuit means briefly energizes both driver coils with a polarity causing rotation of each impeller in opposite directions.

33. The device according to claims 1 or 2 wherein said circuit means includes speed control means responsive to said sensors to enable setting a speed of rotation of said impellers.

34. The device according to claim 30 wherein said sensors are Hall effect sensors.

35. The device according to claim 30 wherein each of said sensors causes said circuit means to energize a respective driver coil only while an impeller blade is passing a trigger point associated with each sensor.

* * * * *